Dec. 27, 1955     C. V. BARNES     2,728,838
WELDING ELECTRODE HOLDER
Filed Oct. 13, 1953

Chalma V. Barnes
INVENTOR.

BY

United States Patent Office 2,728,838
Patented Dec. 27, 1955

2,728,838

WELDING ELECTRODE HOLDER

Chalma V. Barnes, Hammond, Ind.

Application October 13, 1953, Serial No. 385,793

1 Claim. (Cl. 219—8)

The present invention relates to new and useful improvements in welding electrode holders, and has for its primary object to provide, in a manner as hereinafter set forth, a device of this character comprising a unique construction and arrangement of parts whereby welding in what are ordinarily considered difficult or inaccessible places will be facilitated.

Another very important object of the invention is to provide a holder of the aforementioned character which is adapted to take an exceedingly firm grip on the electrode for holding the same securely and insuring a good electrical contact at all times.

Other objects of the invention are to provide a welding electrode holder of the character set forth which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawing, wherein like characters of reference designate corresponding parts throughout the several views, and wherein.

Figure 1:
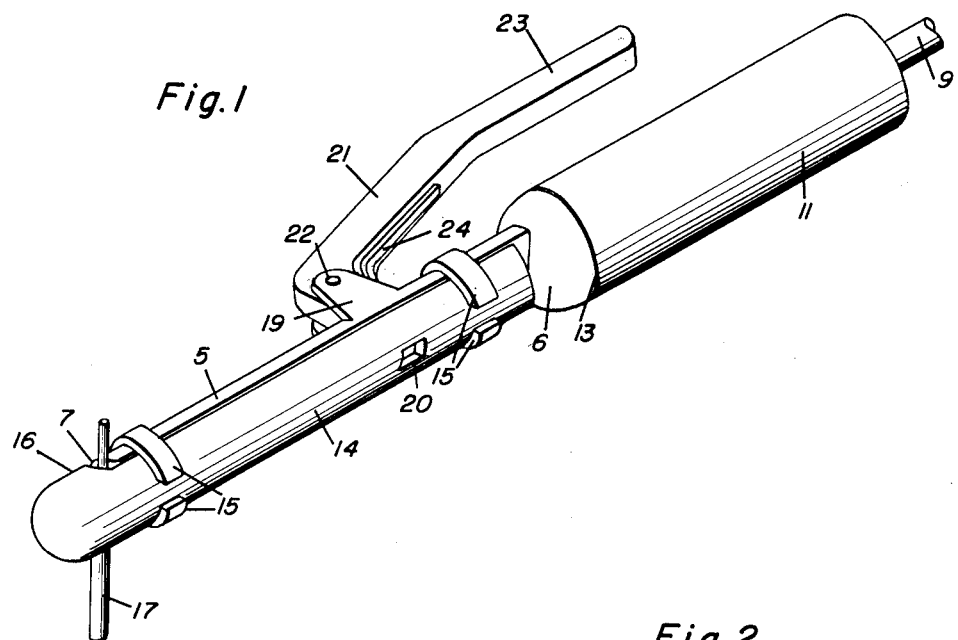
Figure 1 is a perspective view of a welding electrode holder constructed in accordance with the present invention.
Figure 2:
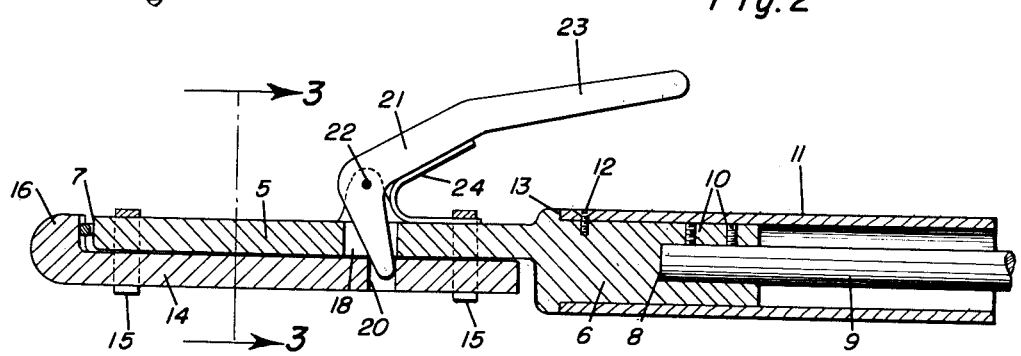
Figure 2 is a view in vertical longitudinal section through the device.
Figure 3:
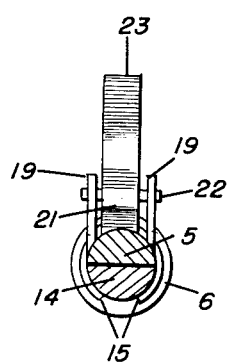
Figure 3 is a view in transverse section, taken substantially on the line 3—3 of Figure 2.

Referring now to the drawing in detail, it will be seen that the embodiment of the invention which has been illustrated comprises a stationary bar 5 of suitable current conducting material, said bar being substantially semi-circular in cross-section, as shown to advantage in Figure 3 of the drawing. The bar 5 may be of any desired length. Formed integrally with the inner end of the bar 5 and extending longitudinally therefrom is a substantially cylindrical socket member 6. The outer end of the bar 5 is formed to provide a stationary inner jaw 7. The longitudinal socket 8 of the member 6 is for the reception of an end portion of a conductor cable 9 which is secured in said socket through the medium of set screws 10. Removably mounted on the socket member 6 and projecting rearwardly therefrom is a tubular handle 11 of suitable insulating material which is secured in position by a countersunk screw 12. The forward portion of the socket member 6 is formed to provide a shoulder 13 which the tubular handle 11 abuts.

Mounted for longitudinal sliding movement on the flat lower face of the bar 5 and projecting forwardly therebeyond is a bar 14 of suitable material, which is also substantially semi-circular in transverse section. The bar 14 is slidable in substantially C-shaped guides 15 which are provided therefor on the stationary bar 5. The forward end portion of the slidable bar 14 is of circular cross-section for providing an upstanding outer jaw 16 which is cooperable with the stationary inner jaw 7 for firmly clamping the conventional welding electrode 17 therebetween.

At an intermediate point the stationary bar 5 has formed longitudinally therein a slot 18. Rising from the bar 5 on opposite sides of the slot 18 is a pair of ears 19. The slidable bar 14 has formed therein at an intermediate point an opening 20 which is in communication with the slot 18.

A bell crank lever 21 is pivotally mounted, as at 22, between the ears 19. One end portion of the bell crank lever 21 is operable in the slot 18 and engaged in the opening 20. At its other end the bell crank lever 21 terminates in an integral thumb piece or handle 23 which extends rearwardly for convenient operation by the thumb of the hand which grips the tubular handle 11. A substantially U-shaped spring 24 is engaged with the bell crank lever 21 for yieldingly urging same in a direction to close the jaws 7 and 16.

It is thought that the operation of the device will be readily apparent from a consideration of the foregoing. Briefly, to move the slidable jaw 16 forwardly to open position away from the stationary inner jaw 7 for receiving the electrode 17 therebetween, the bell crank lever 21 is swung downwardly against the tension of the spring 24 for moving the bar 14 forwardly in the guides 15. The welding electrode is positioned between the jaws and the bell crank lever 21 is released. When the bell crank lever 21 is released, said lever is actuated by the spring 24 for retracting the slidable bar 14 thereby closing the jaws and firmly clamping the electrode therebetween. The device is now ready for use.

It is believed that the many advantages of a welding electrode holder, constructed in accordance with the present invention, will be readily understood and although a preferred embodiment of the device is as illustrated and described, it is to be understood that changes in the details of construction may be resorted to which will fall within the scope of the invention as claimed.

What is claimed is:

A welding electrode holder comprising: a stationary metallic bar of semi-circular cross-section, substantially C-shaped guides fixed at spaced points on said bar, a slidable bar of semi-circular cross section operable in said guides in opposed, face-abutting engagement with the stationary bar and including an end portion of circular cross section providing a jaw cooperable with one end of the stationary bar for receiving and clamping an electrode therebetween, a handle on the other end of the stationary bar, and means on said stationary bar for actuating the slidable bar.

References Cited in the file of this patent

UNITED STATES PATENTS

| | | |
|---|---|---|
| 2,057,320 | York | Oct. 13, 1936 |
| 2,390,999 | Gilliver | Dec. 18, 1945 |
| 2,398,032 | Munro et al. | Apr. 9, 1946 |